(12) United States Patent
Heuert et al.

(10) Patent No.: US 9,329,580 B2
(45) Date of Patent: May 3, 2016

(54) ELECTROMECHANICAL SYSTEM FOR OPERATION WITHOUT INTERMITTENCY OF AN IRRIGATION EQUIPMENT

(71) Applicant: Fockink Indústrias Elétricas Ltda, Panambi-RS (BR)

(72) Inventors: Kurth Heuert, Panambi-RS (BR); Maurício Oberdorfer, Panambi-RS (BR); Aldo Fernando Baum, Panambi-RS (BR)

(73) Assignee: FOCKINK INDÚSTRIAS ELÉTRICAS LTDA., Panambi—RS (BR)

( * ) Notice: Subject to any disclaimer, the term of this patent is extended or adjusted under 35 U.S.C. 154(b) by 0 days.

(21) Appl. No.: 14/481,673

(22) Filed: Sep. 9, 2014

(65) Prior Publication Data
US 2015/0091490 A1   Apr. 2, 2015

(30) Foreign Application Priority Data
Sep. 11, 2013   (BR) .............................. 102013023208

(51) Int. Cl.
| | |
|---|---|
| G05B 1/02 | (2006.01) |
| A01G 25/09 | (2006.01) |
| G05B 1/03 | (2006.01) |
| G05B 11/01 | (2006.01) |
| A01G 25/16 | (2006.01) |

(52) U.S. Cl.
CPC   *G05B 1/02* (2013.01); *A01G 25/09* (2013.01); *A01G 25/092* (2013.01); *A01G 25/16* (2013.01); *G05B 1/03* (2013.01); *G05B 11/01* (2013.01)

(58) Field of Classification Search
CPC ....................................................... G05B 1/02
USPC ................................................... 318/606, 560
See application file for complete search history.

(56) References Cited

U.S. PATENT DOCUMENTS

| | | | | |
|---|---|---|---|---|
| 6,045,333 | A | * 4/2000 | Breit ....................... | F04B 47/08 417/42 |
| 7,976,284 | B2 | * 7/2011 | Koehl ................. | F04D 15/0088 417/42 |

* cited by examiner

*Primary Examiner* — David S Luo
(74) *Attorney, Agent, or Firm* — Volpe and Koenig, P.C.

(57) ABSTRACT

An electronic control by frequency inverter of the displacement system of an irrigation or fertirrigation set is made up of structured pipelines, in which the water distribution sprayers are mounted, and which are coupled to each other, and supported by movable towers which are moved by gear motors driving by means of cardans the wheel gear that in turn drive pneumatic wheels, moving the structure about a fixed point, or pivot point, which is the central tower. The driving of the gear motors of each tower is performed by an electric control unit via a frequency inverter, with analogic signal, preferably a potentiometer, or position encoder digital sensor or optical sensor of alignment with relation to the front and back tower.

8 Claims, 6 Drawing Sheets

ELECTROMECHANICAL SYSTEM FOR OPERATION WITHOUT INTERMITTENCY OF AN IRRIGATION EQUIPMENT

FIELD OF THE INVENTION

The present invention patent application relates to an electromechanical system for operation without intermittency of an irrigation equipment, used in the agriculture, comprised of structured overhead pipelines, where the water distribution sprayers are mounted, and that are coupled to each other by a flexible joint, forming spans that are supported by movable towers, which are moved by gear motors that drive by means of cardans the wheel gear, which in turn drive pneumatic wheels that move the structure about a fixed point, or pivot point, which is the central tower. The system has its speed controlled by a sensor of alignment position with relation to the front and back tower that sends a proportional analogic signal of offset/misalignment between support towers, which will be processed through a microprocessor electronic circuit that has a set of operational instructions directly programmed in the processor that sends the increase or decrease signal to the frequency inverter, which controls the gear motor, increasing or decreasing the speed of the support tower, ensuring the alignment of the overhead pipeline spans, with continuous movement, without the need to stop and go.

BACKGROUND

As it is known by those skilled in the art, the irrigation systems known nowadays present as their main problem the stop and go intermittent movement of the support towers, needed to align the overhead pipeline spans and to compensate the travelled distance difference in the system of the central pivot, wherein the outer tower travels through a distance greater than the inner ones.

The pipelines are provided with water outlets with sprayers along the whole length, these pipelines being of various diameters according to the area size to be irrigated and the water amount to be applied, which varies from culture to culture. However, today, the ones that have an irrigation system, besides using it to irrigate the plants, also uses it for the application of agricultural pesticides and for the application of nutrients necessary for the plants.

The pipelines are provided with water outlets with sprayers along the whole length, these pipelines being of various diameters according to the area size to be irrigated and the water amount to be applied, which varies from culture to culture. The spans are suspended by movable towers that may have variable height due to the culture to which the equipment is designated, the spans are coupled to each other and may have variable length according to the need of the area to be irrigated and are moved by gear motors that drive by means of cardans the wheel gears, which in turn drive the pneumatic wheels that move the structure. In the case of the central pivot, an overhead structure turns about the pivot central tower, forming an irrigated area in the form of a circle. In the case of the linear irrigation system, the towers are dislocated in alignment with each other, linearly forming an irrigated area in the form of a rectangle. For the alignment between the towers, there is a microswitch driving device that when driven due to the misalignment moves the tower through the driving of the motor reducer that is initiated in the nominal speed. The alignment device consists of a metallic bar situated between both lances and coupled to a cam which drives the set of two microswitches, the service microswitch and the emergency microswitch. The service microswitch drives the gear motor set in a direction (e.g. clockwise) when closing the contact of the microswitch, through the cam, which is coupled to the control bar and which in turn is coupled to the immediately after span, when the orientation direction of the irrigation system is reverted, (e.g. counterclockwise), the microswitch drives the gear motor when opening the contact of the microswitch (the orientation direction of the towers is selected by the operator in the central panel), while the emergency microswitch functions as to deactivate the equipment when there is an extreme misalignment that will hinder the operations of the irrigation system. The microswitches have a deadband which is the dead state of the electric contact between closed and open or opened and close. This phenomenon is called deadband or hysteresis. In a set of many joined spans of an irrigation system, these deadbands are added and can induce an arc in the set of various spans, that is, the lances are not perfectly aligned to each other. This arc induced in the set of various spans may induce great tensile or compression pressures between the spans, causing mechanical fatigue in all of the set. These tensile or compression efforts affect mainly the central tower, making it possible to induce its displacement, pulling the tower set that is leaded in concrete blocks on the ground.

Due to technical reasons, it is necessary in spray irrigation to allow the system to move in low speeds, in a way that the percent timer is, for example, adjusted in 50%, which means that the final tower remains, during the one minute period, 30 seconds in operation and 30 seconds stationary, thereafter, the front towers will remain idle for a longer time. This final tower is also called the control tower. There is no sensor, once no angular offset of a subsequent movable tower needs to be registered herein.

The current spray irrigation systems that make the towers stop and go partially solve the problem of misalignment between the overhead pipeline spans and the different distances the towers have to travel through in the central pivot system. However, they do not solve problems with the great mechanical efforts that cause wear in the structural components and the problems of movement due to the stops and start-ups, which also imposes the very low displacement speed of the irrigation set. These constant stops and start-ups induce a non-uniform distribution of water blade in the soil to be irrigated, resulting in the same phenomenon during the application of liquid fertilizers and agricultural pesticides, along with water. In the stops periods of the motors determined by the alignment sensors of the movable towers, a greater precipitation of water and the products diluted in it takes place in this stop location, resulting in an excessive irrigation, causing losses of production and water by deep percolation, losses of nutrients by lixiviation, making it easy for culture diseases to arise, causing the costs increase, with water, energy, fertilizers and agricultural pesticides waste and increase of the soil contamination by the products excess in the stop locations. These problems tend to aggravate as the speed of the pivot reaches its lowest and/or consequently higher will be the blade determined by the regulation of the per centimeter relay.

SUMMARY

With the aim to overcome the drawbacks deriving from the present techniques, the present electromechanical system for operation without intermittency of an irrigation equipment was realized, the main aim of which is the continuous displacement of the overhead pipeline supported by the movable towers and that performs through the sprayers the water distribution in the ground, wherein, in order to achieve this, the electromechanical system is provided with a set of parallel metallic bars, joined by a steel cable, with springs in its ends. This set of steel cable with springs allows the movement flexibility of unleveling, distortion and misalignment between spans. To detect the exact position of alignment between overhead pipeline spans, the steel cable surrounds a roller which rotates only with the action of the misalignment between the movable spans of the pipeline, any unleveling or distortion movement does not interfere with the system. The roller has an embedded shaft that rotates along with the roller in the upper tip of the shaft, there is mounted a position and alignment sensor (preferably a potentiometer, or encoder, or optical sensor), with relation to the front and back tower, that sends a proportional analogic (or digital) signal of offset/misalignment between the support towers, which will be processed through a microprocessor electronic circuit having a set of operational instructions directly programmed in the central processing unit that inform the frequency inverter about at which speed the gear motor must rotate, ensuring the alignment of the overhead pipeline lances, with continuous movement, without the need to stop or dislocate.

BRIEF DESCRIPTION OF THE DRAWINGS

In order to complement the present description to obtain a better understanding of the characteristics of the present invention and according to a preferred practical embodiment thereof, a set of accompanying drawings are present, wherein the following is represented in an exemplary but not limiting manner.

DETAILED DESCRIPTION OF THE PREFERRED EMBODIMENTS

Figure 1:
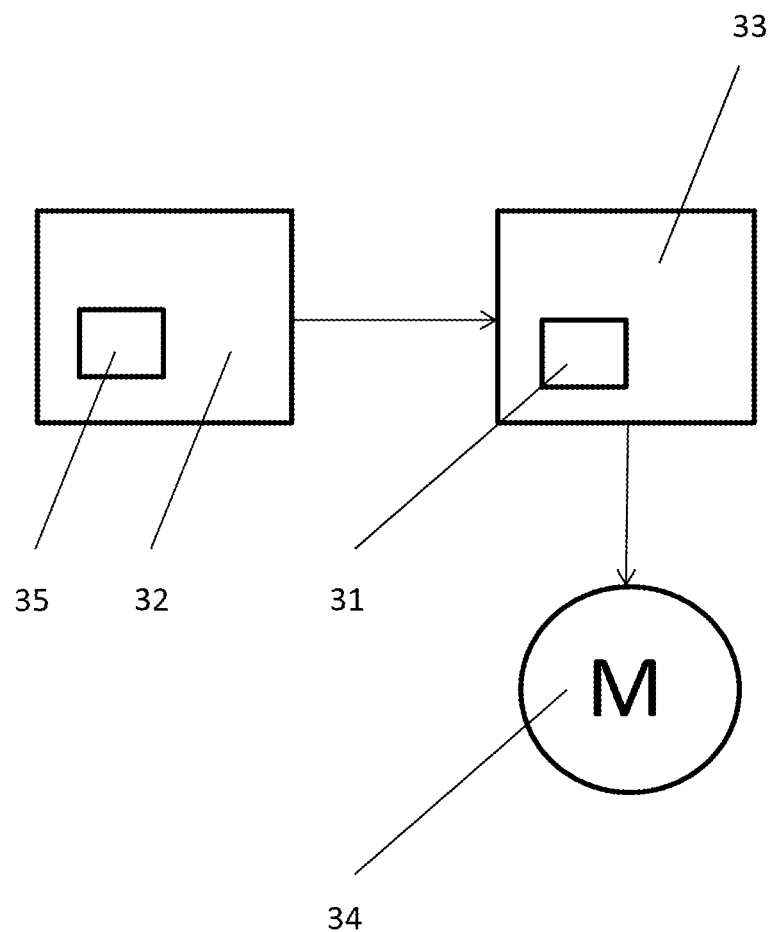
FIG. 1 shows a schematic view of the interaction between the electric and electronic components of the master control box and the final tower.
Figure 2:
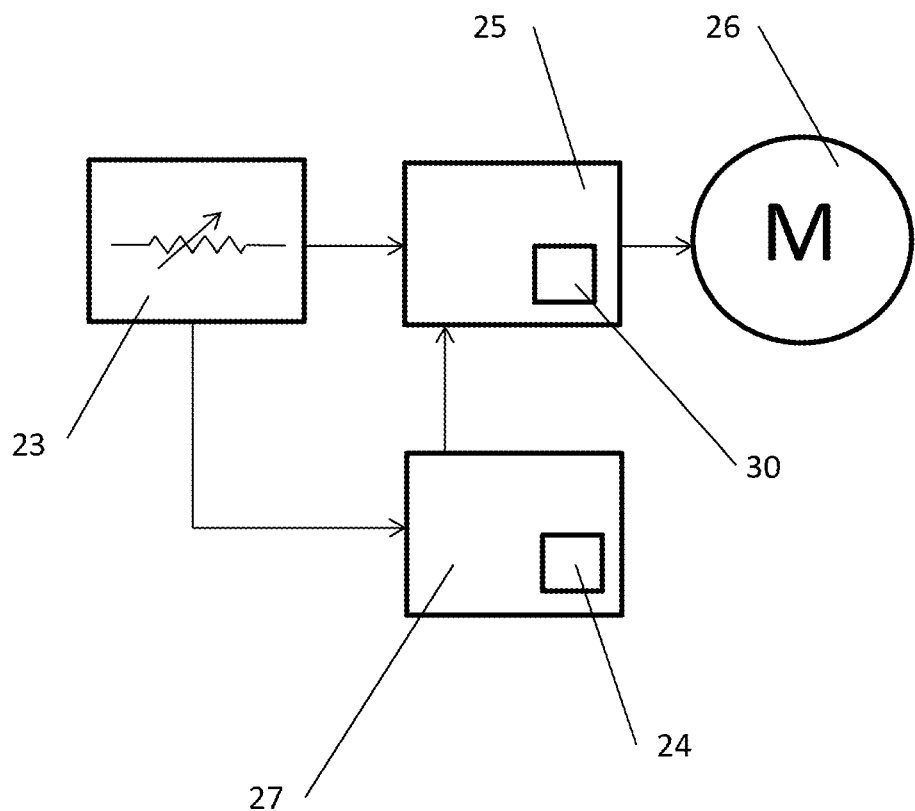
FIG. 2 shows a schematic view of the interaction between the electric and electronic components of the speed control system of the middle towers.
Figure 3:
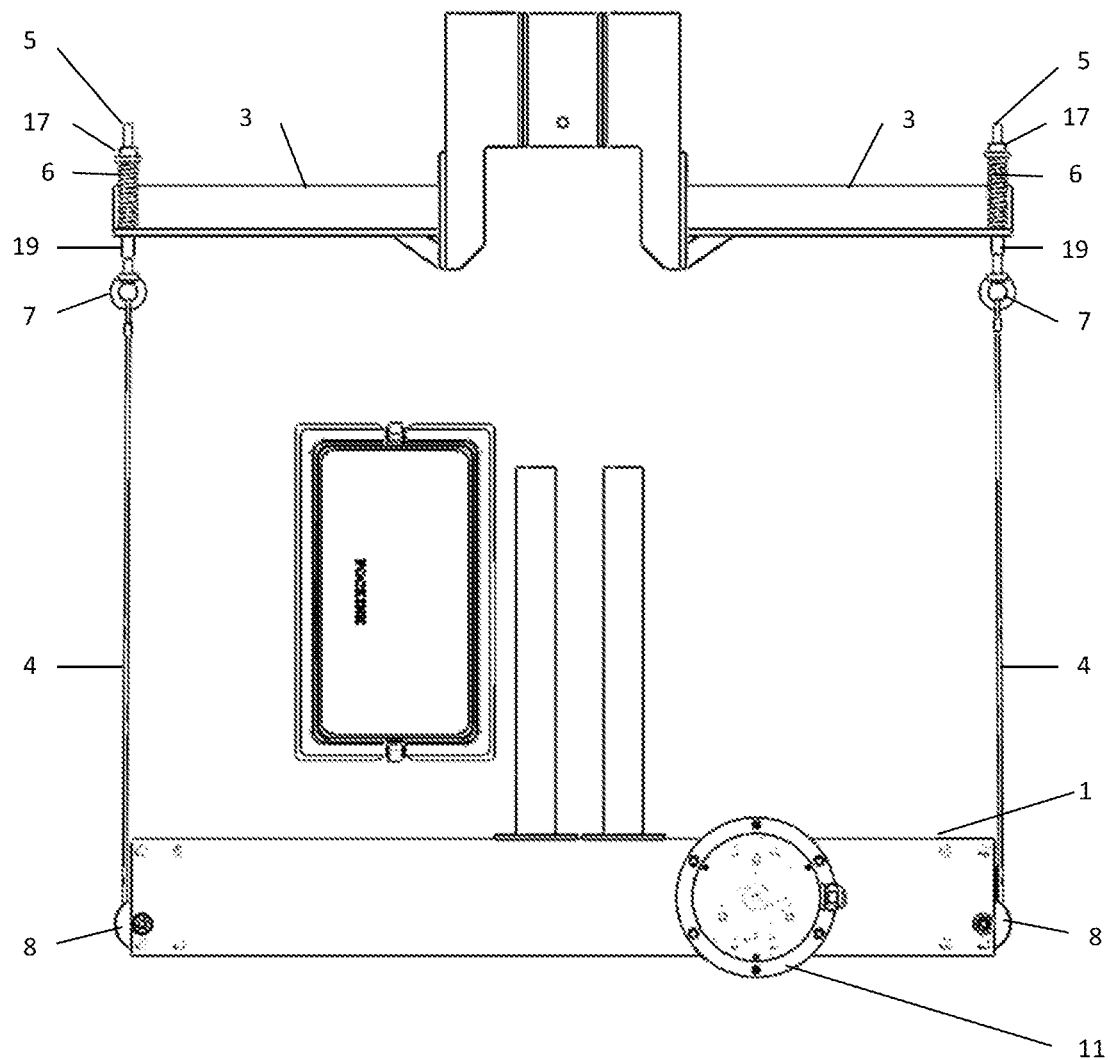
FIG. 3 shows a perspective top view of the electromechanical device applied to spans of the overhead tubes.
Figure 4:
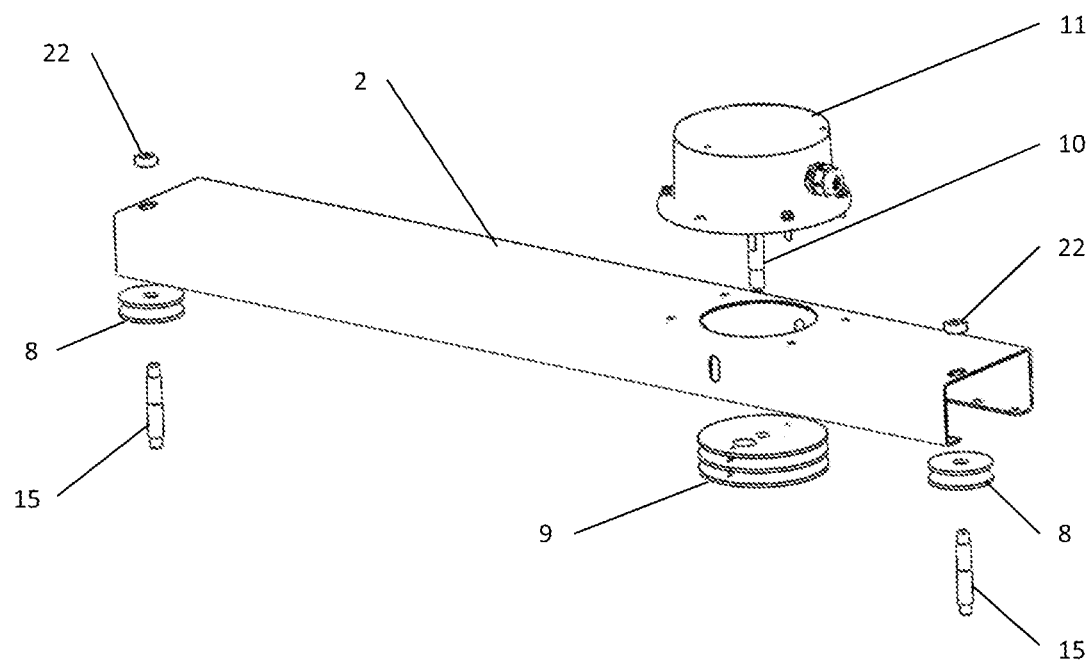
FIG. 4 shows a perspective exploded view of the main body.
Figure 5:
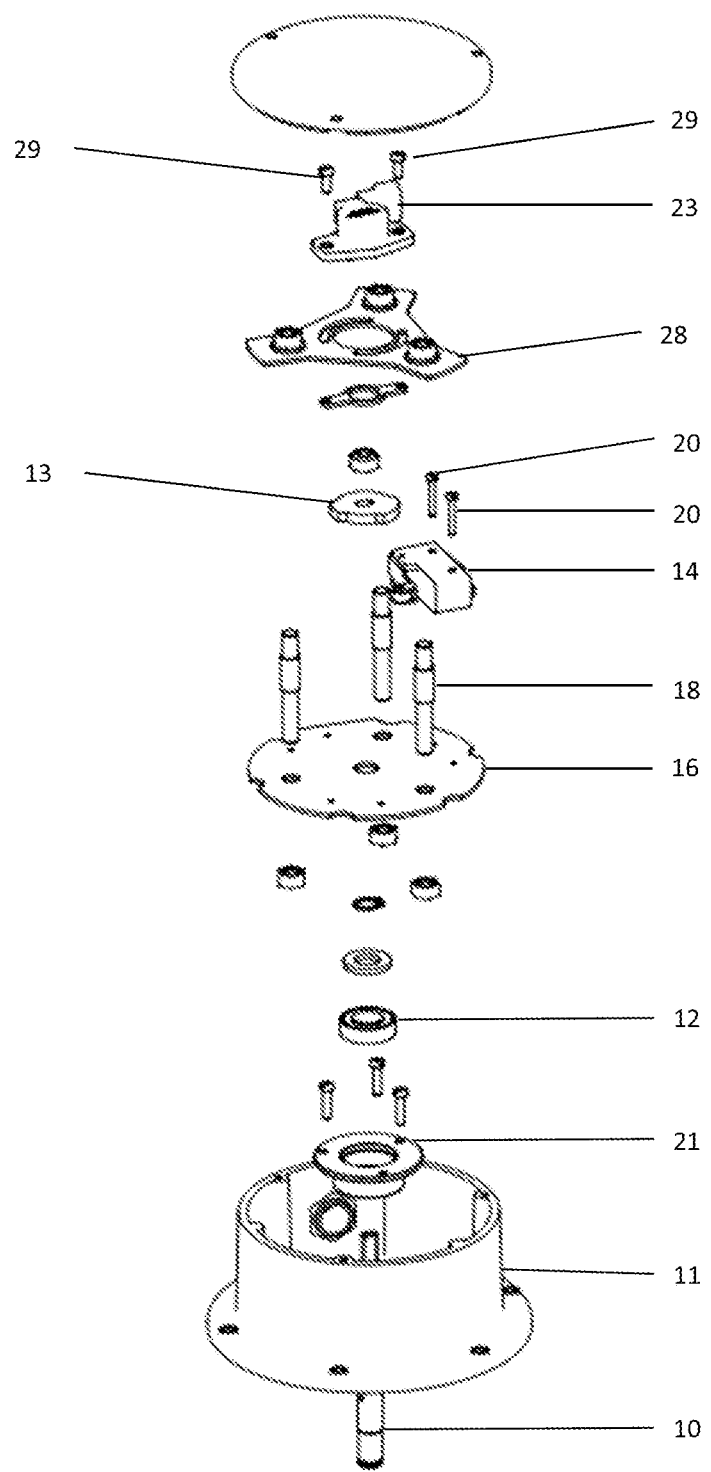
FIG. 5 shows a perspective exploded view of the driving and support components of the position sensor.
Figure 6:
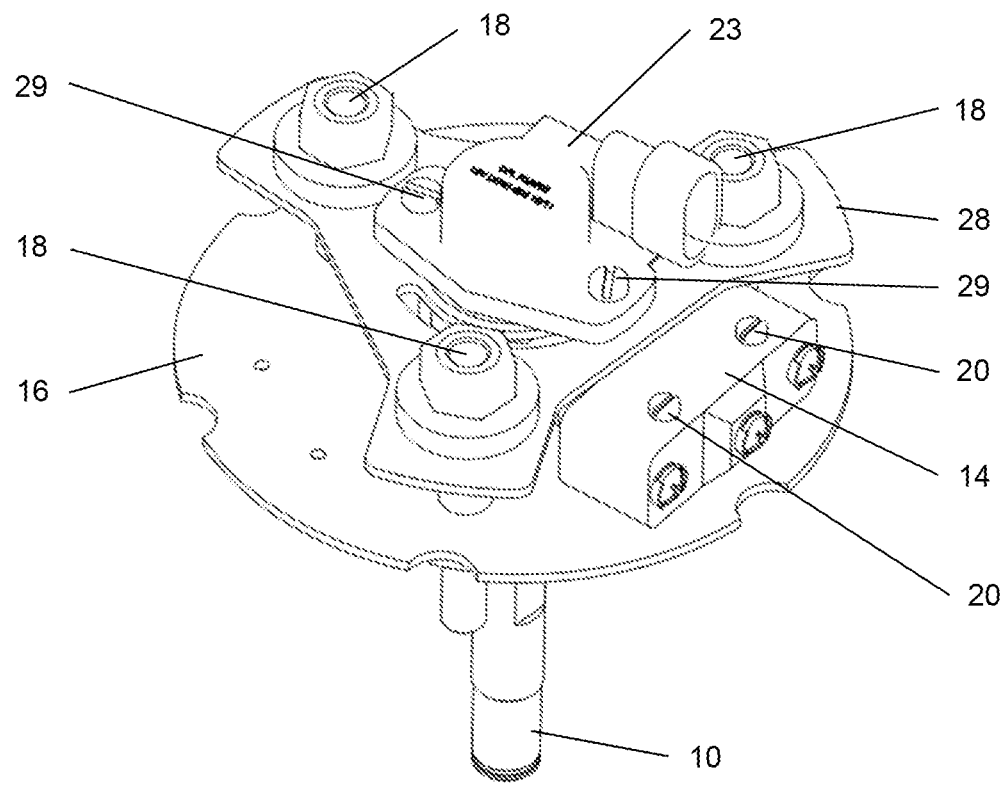
FIG. 6 shows a perspective mounted view of the position sensor coupled to the driving shaft.

According to the figures, the present electromechanical system for operation without intermittency of an irrigation equipment is formed by two rods (3) being horizontally joined forming a "T" with the tip of the rear pipeline. The joining between the spans of the pipeline is flexible, and allows for an angular movement between the pipeline sections. At the tip of the front pipeline there is a joined main body (1) forming a "T" and having the bar (2), which is linked to the rods (3) by a steel cable (4), linked to the nuts with an eye (7) wherein are threaded the threaded bars (5) having thereupon the tubes (19) in which there are the springs (6) that lean against the rods (3), wherein there is upon the tube (19) the springs (6) that lean against the rods (3), the adjustment of the tension of the steel cable) (4) is performed through the nuts (17) which are threaded in the other end of the threaded bars (5) and which compress the springs (6) against the rods (3), pulling the steel cable (4) passing through the rollers (8) in a 90 degree angle, the rollers (8) being linked by the shaft (15) fixed by the nuts (22) in the bar ends (2). When there is an angular movement between the two subsequent spans of the pipeline, this movement is transmitted by the steel cable (4), which surrounds the roller central (9) and makes the shaft (10) rotate, which is mounted to the frame (11) by the bushing (21) having the bearings (12). The shaft (10) has fixed in its upper end the cam (or eccentric) (13), which drives the emergency electric microswitch (14) secured by the screws (20) to the flange (16) fixed to the frame base (11) by the pins (18). The microswitch (14) turns off the gear motor, in emergency events, when the misalignment between the overhead pipelines is excessive and does not allow the displacement, potentially causing mechanical damage to the system structure.

Above the cam (13), at the tip of the shaft (10), there is coupled the position analogic (or digital) sensor, preferably a potentiometer (23) (or encoder, or optical sensor), fixed by the screws (29) to the support (28), which is secured upon the flange (15) by the pins (18), the position analogic (or digital) sensor, preferably a potentiometer (23) (or encoder, or optical sensor), providing an offset/misalignment proportional analogic (or digital) signal between towers, which will be processed through a microprocessor electronic circuit (24) or (30), sending this control information with PID (Proportional, Integral and Derivative) characteristics to a frequency inverter (25) controlling the gear motor (26) so that the towers travel at a speed necessary to keep the alignment therebetween. This detection intelligence definition of the ideal speed of each tower is defined through a set of operational instructions, directly programmed in the integrated circuit (firmware) (24) housed in the electronic circuit (27), or directly in the memory (30) of the frequency inverter (25). In the individual speed control principle, the microprocessor electronic circuit (24) or (30) of each tower is based on the fixed speed in the last tower having the bigger perimeter to be travelled in order to complete the turn.

The microprocessor integrated circuit (firmware) (31) of the electric box of the last tower receives a pulse signal from the master control box (32) via the microprocessor (35) which varies from 5% to 100%, meaning a variable frequency of the frequency inverter (33) of 6 Hz to 120 Hz applied to the gear motor (34) of this last tower. This percentage variation implies the application of a water blade over the ground inversely proportional with relation to the maximum blade designed for the water pumping set. With this received percentage information, the microprocessor integrated circuit (firmware) (31) of this final electric box acts upon the gear box (34), moving the tower in the defined speed, stopping only there is an emergency misalignment between some of the towers of the pivot and when an emergency microswitch (14) deactivates the system.

When initiating the movement of this final tower, the program respects the starting ramp to avoid the lack of control between the remaining towers. This starting ramp allows the remaining middle towers to adjust to the speed proportional to their perimeter to be travelled. The microprocessor (firmware) (31) of the final electric box integrates an electric wiring optimization routine necessary to receive the information of speed/water blade percentage and turnover direction to be travelled. This routine uses an electric signal logic that allows it to be possible through only one electric signal (an electric conductor) to receive the speed information (per centimeter), the turnover direction to be travelled and turn-on/turn-off of the gun (final sprayer for distance water launching aiming to widen the irrigated area).

After the speed of this last tower was fixed, which can vary between 5% and 100%, each position analogic sensor (23) will inform to its respective electronic circuit (25) or (27) microprocessor (firmware) (24) or (30) the movement proportion in a way to automatically tune the ideal individual movement speed of each tower with no stops, that is, each tower moves continuously in the ideal speed, based on the Proportional, Integral and Derivative (PID) control functions, suitable to the control characteristics necessary to the continuous movement and with the possibility of overspeed, designated to the correct and specific handling of an irrigation system by linear or central pivot, with no start-ups and stops during intervals.

The integrated circuit intelligence (firmware) (24) or (30) also contemplates the automatic detection of the turnover direction of the gear motor (26) according to the misalignment direction detected due to the continuous movement/rotation direction of the last tower of a greater perimeter to be travelled, and therefore there is no need of special commands through electric wiring. Both integrated circuit models (firmware) (31) of the electronic circuit of the final frequency inverter (33) and (24) or (30) of the middle electronic circuit (27) or (25) allow for the continuous displacement in distinct frequencies automatically tuned of all the towers, avoiding constant stops and start-ups. This control method allows for the application of water and/or chemigation, with no undesirable concentration, due to moving in constant/continuous speed.

Another advantage of the implementation of this control system for continuous advance of the set of towers with adjustable speeds in the irrigation, based in the use of frequency inverters (25) for the control of the speed of the gear motor (26) of the towers driving is also the use of power feed in direct current (DC), besides the traditional method of power feed in alternating current (AC) which has three phases in the pivot overhead part.

The invention claimed is:

1. An electromechanical system for operation without intermittency of an irrigation equipment, the electromechanical system comprising:
    a set of parallel metallic bars (1), joined by a steel cable (4) which one surrounds a roller (9) which rotates with a misalignment between the movable spans of the pipeline,
    the roller presenting an embedded shaft (10) that rotates along with the roller,
    a position sensor (23), disposed in an upper tip of the shaft (10) and fixed by the screws (29) to the support (28) which is secured over the flange (16) by the pins (18),
    a gear motor (26), provided for independently moving each span support tower, the gear motor linked by electric conductor to a frequency inverter (25),
    wherein the position sensor (23) sends a proportional, analogic or digital signal of offset/misalignment between the support towers to an electronic circuit (27) comprising a microprocessed electronic circuit (24) having a set of operational instructions directly programmed in the central processing unit that inform the frequency inverter about at which proportional speed the gear motor (26) must rotate, ensuring the alignment of the overhead pipeline lances, with continuous movement, without the need to stop or dislocate.

2. The system according to claim 1, wherein the position sensor (23) is directly linked to the frequency inverter (25) by an electric conductor, the frequency inverter (25) comprising a microprocessed electronic circuit (30) having a set of programmed operational instructions for informing the frequency inverter about at which proportional speed the gear motor (26) must rotate.

3. The system according to claim 1, wherein the position sensor (23) provides an offset/misalignment proportional, analogic or digital, signal between towers, the proportional signal is processed through an electronic circuit (24, 30), and control information with PID (Proportional, Integral and Derivative) characteristics is sent to the frequency inverter (25) for controlling the gear motor (26) so that the towers travel at a speed necessary to keep the alignment therebetween.

4. The system according to claim 1, wherein a last tower comprises a master control box (32), the master control box comprising a microprocessed electronic circuit (35) linked by an electric conductor to a microprocessor integrated circuit (31) which is linked by an electric conductor to an frequency inverter (33) linked by an electric cable to a gear motor (34), the microprocessor integrated circuit (31) of this final electric box (32) controlling the gear box (34) for moving the last tower in the defined speed.

5. The system according to claim 4, wherein for initiating the movement of the final tower, an electronic circuit (35) program acts based on a starting ramp.

6. The system, according to claim 1, wherein the sensor (23) is a potentiometer position analogic sensor.

7. The system, according to claim 1, wherein the sensor (23) is an encoder digital sensor.

8. The system, according to claim 1, wherein the sensor (23) is a position optical digital sensor.

* * * * *